United States Patent [19]

Kelly

[11] 3,896,499

[45] July 29, 1975

[54] SAFETY BELT FOR SNOWMOBILE AND MOTORCYCLE PASSENGERS

[76] Inventor: Charles E. Kelly, Rt. 2, Spicer, Minn. 56288

[22] Filed: Nov. 18, 1974

[21] Appl. No.: 524,411

[52] U.S. Cl. .................................................. 2/311
[51] Int. Cl.² ........................................... A41F 9/00
[58] Field of Search ......... 2/93, 300, 301, 338, 311, 2/312, 322, 321, 325; 182/3

[56] References Cited
UNITED STATES PATENTS

| 3,487,474 | 1/1970 | De Meo | 2/311 |
| 3,533,107 | 10/1970 | Raneri et al. | 2/93 |
| 3,562,812 | 2/1971 | Greggains | 2/94 |
| 3,564,616 | 2/1971 | Battaglia | 2/311 |
| 3,840,902 | 10/1974 | McNeill | 2/311 |

Primary Examiner—Geo. V. Larkin

[57] ABSTRACT

A wide belt encircles the outer garments of a driver of a tandem seated vehicle. Vertical loops encircle the wide belt on each side of it, and are in position to encircle a portion of the arms and hands of a rider seated in the rear tandem seat.

9 Claims, 7 Drawing Figures

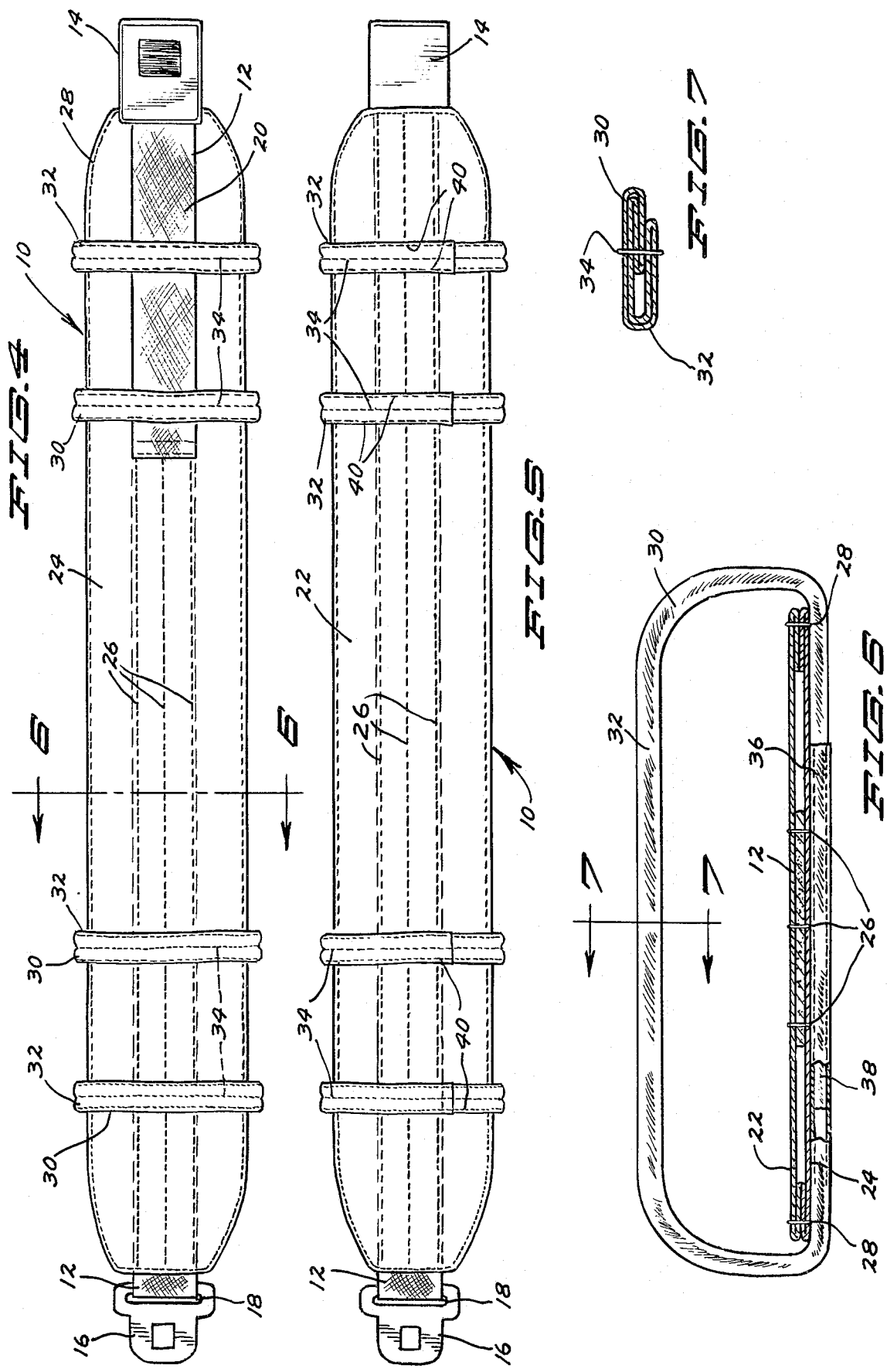

SAFETY BELT FOR SNOWMOBILE AND MOTORCYCLE PASSENGERS

BACKGROUND OF THE INVENTION

This invention has relation to a safety belt positioned about the body of the driver of a snowmobile or motorcycle or similar vehicle. The safety belt is provided with vertical loops extending around the belt at positions where they can retain the arms and hands of a rider of such vehicle over long periods of time with great reductions in the fatigue and danger to the rider.

Safety belts which encircle drivers and passengers in standard motor vehicles with side by side seating are now well known and required by law in many instances. These belts have the function of retaining the rider in close proximity to the vehicle seat should there be an accident or other violent change in the momentum of the vehicle. Customarily, these devices are provided with quick disconnect, quick release buckles. Such buckles are used in the safety belt of the present invention, but the particular construction of such buckles forms no part of the present invention.

It has been suggested to provide a relatively wide belt around the waist of a driver of a motorcycle. See U.S. Pat. No. 3,487,474 to DeMeo, granted Jan. 6, 1970; and U.S. Pat. No. 3,564,616 to Battaglia, granted Feb. 23, 1971. However, the hand grips provided in safety belts of the prior art are designed to be held by a passenger with her hands in a substantially horizontal plane, and not in a substantially vertical plane as they would be if she were to hold on to the driver by extending her arms around him and holding her body closely adjacent to his.

This hugging action with the two bodies in close proximity was perhaps the safest procedure over the short haul before the present invention. In fact there are certain advantages to this form of contact even over the present invention. One is the feeling of security on the part of the rider and another is the additional control over the movement of his vehicle which the driver has when he has the complete "feel" of the rider to help him "lean" into the turns, etc.

The difficulty with simply "hanging on" to the rider by hugging, and it has often been a fatal and often a damaging difficulty, is that over the long haul, fatigue sets in, and the grip of the rider relaxes to the point where unexpected changes in direction and speed, or even routine changes in direction and speed, cause the loosened grip or the absence of grip of the rider to result in the rider being dislodged or thrown from the vehicle.

In situations such as occur using the DeMeo patent, U.S. Pat. No. 3,487,474, the rider, either initially or after tiring of holding closely to the driver, must adjust her position substantially rearwardly in order to move her hands into position with the palms down, or even with the palms up, and holding onto the provided relatively narrow hand straps. Obviously any sudden change in direction or speed or both will cause the rider to tend to snap like the end of a whip behind the driver, thus putting the full strain of the dislodged rider's weight against the driver suddenly and unexpectedly, with potentially disastrous results.

In connection with structures shown in this DeMeo patent and the Battaglia patent, the positioning of the arms with the palms down, or even with the palms up, rapidly becomes very tiring to the rider, and arm cramps ensue. This results in a loosening or a complete release of the hands periodically to try to overcome this fatigue. Sudden or even routine changes in direction and speed can have disastrous results at these times.

BRIEF SUMMARY OF THE INVENTION

A relatively wide body belt extends snugly around the outer garments on a middle section of the driver of a tandem two seat vehicle. Vertical hand and arm loops pass clear around the body belt, are integrally attached to it at interior surfaces of loops and belt. The loops extend outwardly away from the belt sufficiently far to encompass portions of the hands and forearms of a rider situated rearwardly of the driver. The loops are substantially flat and are wide enough to provide hand grips which extend over a substantial portion of the palm of the hand of a rider.

In the form of the invention as shown, these vertical loops are four in number and two are situated to be slightly to the rear and two slightly to the front of the driver. One loop or more than two loops in each side could be used, however.

As shown, a quick disconnect buckle fastens the body belt in front of the driver, but any other belt buckle or fastening means which is as strong as the body belt and as the loops can be used. The fastening means can also be located to the rear of the driver.

IN THE DRAWINGS

FIG. 4 is an outside elevational view of the safety belt of FIGS. 1, 2 and 3 when laid flat;

FIG. 5 is an elevational view of the safety belt of FIG. 4 but turned over to disclose the inside surface thereof;

FIG. 6 is an enlarged sectional view taken on the line 6—6 in FIG. 4; and

FIG. 7 is an enlarged sectional view taken on the line 7—7 in FIG. 6.

DESCRIPTION OF PREFERRED EMBODIMENT

Figure 1:
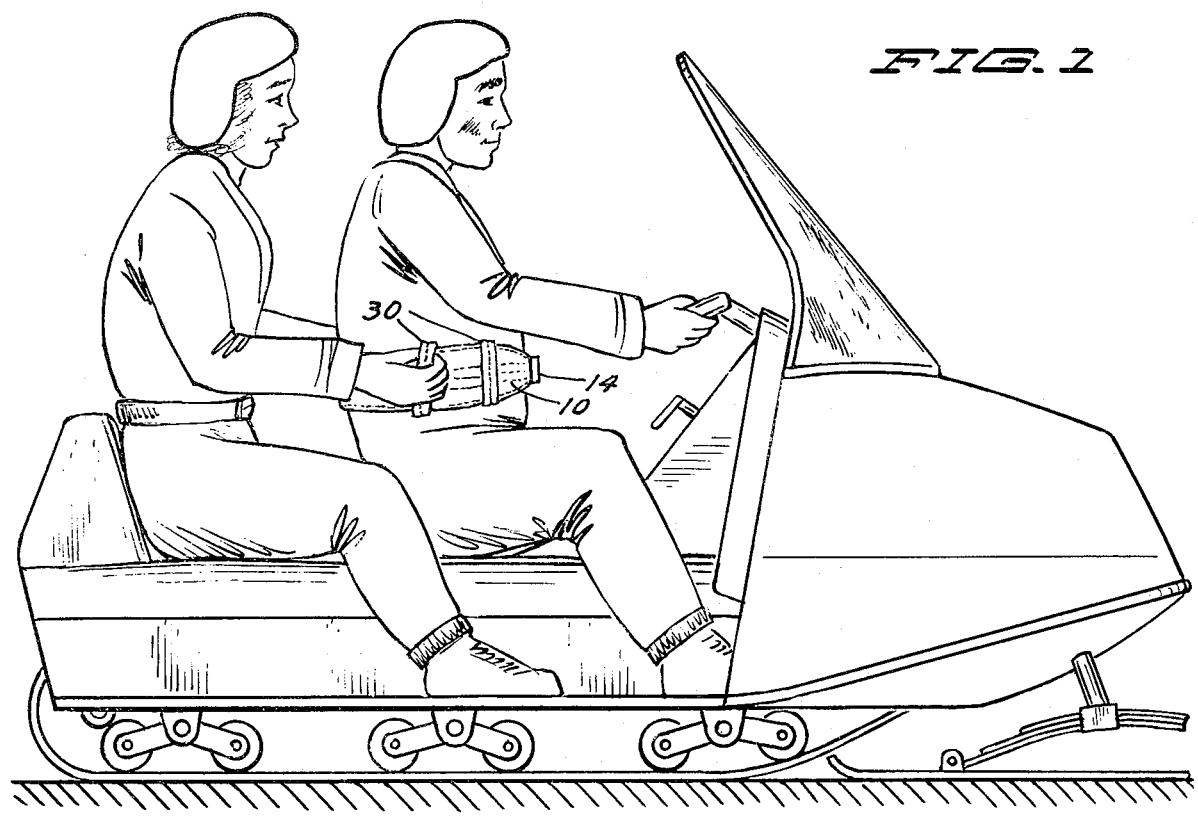
FIG. 1 is a side elevational view of a driver and a rider using the safety belt of the invention in conjunction with a tandem seated vehicle.

A safety belt 10 includes a longitudinally extending safety strap 12 which is connected on one end to a quick release buckle 14, and on the other end to a quick release clip 16 designed to mate with the buckle. Safety strap 12 is connected through a slot 18 provided in clip 16 and back on itself in any usual or approved manner, forming no part of the present invention. The strap 12 adjustably passes through the quick release buckle 14 and is gripped within that buckle in any usual or preferred manner, also forming no part of the present invention. The portion of the strap 12 which extends past the buckle 14 is indicated at 20. The strap 12 can be made of a number of suitable materials including a closely woven fabric webbing which will not stretch appreciably.

A wide longitudinally extending inner band 22 and an equally wide longitudinally extending outer band 24 of the safety belt 10 are sewed to the safety strap 12 along the entire lengths of the inner and outer bands as indicated at 26,26,26. The outer peripheral edges of each of these bands are turned in toward the strap and the peripheral areas of bands 22 and 24 are sewed to each other as seen at 28. These bands can be made of many suitable materials such, for example, as leather, polyvinyl chloride, etc. The qualities of toughness, resistance to tearing, and retention of toughness and other strength attributes to extremely low and extremely high temperatures are criteria used in choosing the materials for such bands.

A plurality of rider retaining loops 30 are each made of individual tubes 32 of similar suitable material folded back on top of itself and stitched together as at 34. Each loop is formed of a first end portion 36 of tube 32 fitting down over a second end portion 38 thereof. This assembly is made before the stitching 34 is done longitudinally clear around each loop. After this is done and the stitching 34 is in place, each rider retaining loop 30 is placed on the safety belt 10 and additional stitching 40, parallel to the stitching 34 is utilized to sew the portion of each loop in contact with the interior surface of the belt clear through the entire belt, including both the inner band 22, the outer band 24, and also the safety strap 12. Each of these loops extends far enough outwardly of the belt so that a rider can pass part of one of her forearms including her hand between the belt and loop.

Figures 2, 3:
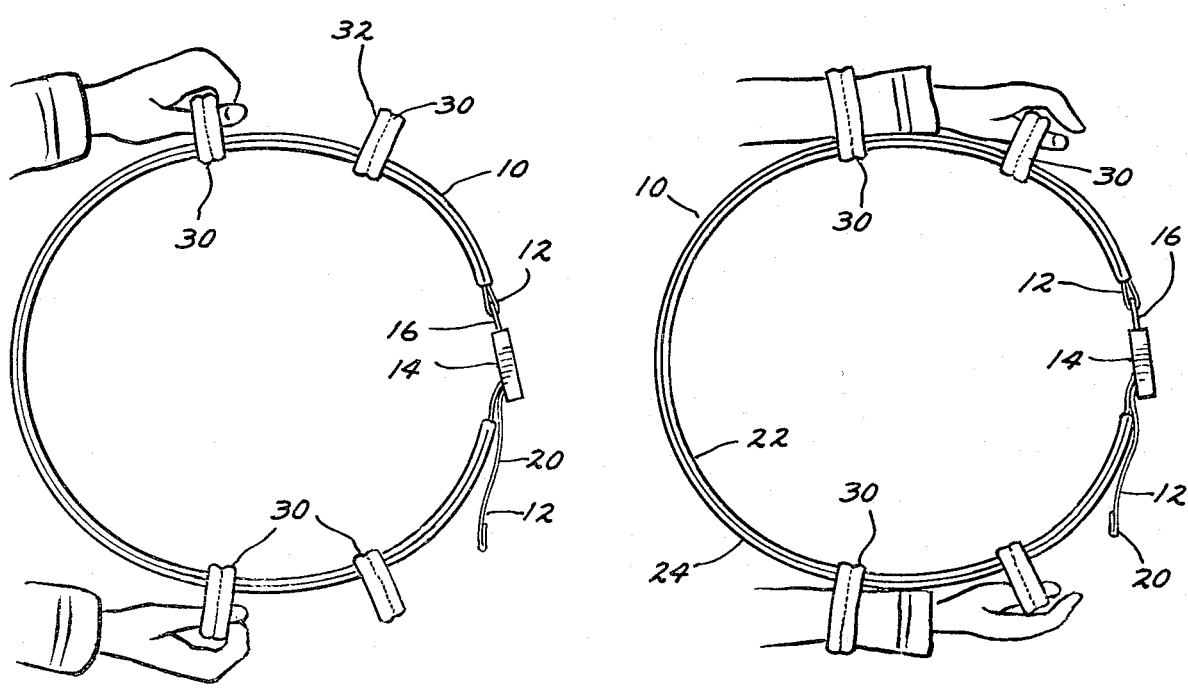
FIG. 2 is a top elevational view of the safety belt of FIG. 1 showing its relationship to the arms and hands of a rider as seen in FIG. 1.
FIG. 3 is a top elevational view of the safety belt as seen in FIG. 2 but showing a different relationship between the arms and hands of a rider with respect to the belt.

In operation, the driver of a motorcycle, snowmobile, or like tandem-seated vehicle will encircle his waist with the safety belt 10 as seen in FIGS. 4 and 5 and will fasten the quick release clip 16 into the quick release buckle 14 so that it will be positioned as seen in FIGS. 1, 2 and 3. In order to make the fit a snug one, he will put on the tongue portion 20 of the safety strap 12 to slide this portion of the strap with respect to the quick release buckle 14 until a comfortable but quite snug and tight fit is obtained. He will then take his position on the front seat of the vehicle, and a rider will take the position on the rear seat thereof substantially as shown in FIG. 1.

For a short run, the rider can grasp the rider retaining loops 30 nearest to her and hold tightly to them. When in this position, the driver will be aware of every movement made by the rider because every such movement will be transmitted to him at his right and left sides through the loops 30. Equally important, the rider will know every move of the driver because all such movement will be transmitted to her hands by his movement and consequent movement of the safety belt 10 and these same loops 30. Thus the presence of the rider's hands on loops 30 on both sides of the driver will tell the driver, without visual contact with the rider, that the rider is not only in place but is hanging on. As the driver leans one way or the other in preparation for making a turn and for balancing himself and his vehicle in the turn, this is transmitted to the rider who can then similarly balance herself in anticipation of a turn and during the turn. As the driver straightens up, the rider will do likewise as she can feel this movement through the safety belt, the loops 30 and her hands.

Similarly, as the driver spots bumps or other abnormalities in the path ahead, he will tend to hunch forward and put more weight on his legs to brace his body to withstand such bump, jump or other abnormality. This motion is likewise felt by the rider who will similarly position herself.

Should the rider, for some reason, tend to become dislodged, the driver knows this immediately through pressure exerted on his sides through the safety belt, the loops 30 which the rider is grasping, and her hands.

This is to be contrasted with such prior art as the Battaglia patent, U.S. Pat. No. 3,564,616, in which the horizontal extending loops are fastened to the driver's waistband only at the center portion thereof, or are not fastened there at all. This structure will allow the rider to get support from the driver only in the situation where the driver accelerates rapidly thus tending to throw the rider off the rear. Other than that, it is obvious that the rider's hands can move forwardly, and upwardly and downwardly a considerable distance without putting any pressure on the safety belt. Thus the driver does not necessarily know the condition of the rider's positioning on his vehicle. Such forces as are transmitted through the handles or grasping means 19 and 20 are only felt by the driver right in the middle of the forward part of his body in alignment with the stitching 17.

The patent to DeMeo, U.S. Pat. No. 3,487,474, discloses a belt with horizontal hand grips located directly behind the back of the driver. Here again, the only effective support for the rider is that support which is afforded when the driver suddenly accelerates. With the rider's hands spaced relatively close together, she cannot get the feel for the movements of the driver as is the case with the present invention. Similarly, the driver is not made aware of the positioning of the driver except by dragging movements on the part of the rider located relatively close together in the center of his back.

The contact at substantially the outer sides of the driver's body very greatly enhance the communication and team work between the driver and the rider, as set out above. Such team work is necessarily missing from the structures of the DeMeo and Battaglia patents.

In the case of both of these patents, it is contemplated that the rider will use her hands with the palms up or, more probably, with the palms down, thumbs facing toward each other. This is not a natural position. It takes muscle tension to hold the arms in that position, and it forces the elbows unnaturally away from the sides. The arms, forearms, wrists and hands become fatigued quite rapidly.

Contrast this with the positioning of the hands as seen in FIGS. 1, 2 and 3 of the present invention. This is a natural position and can be maintained safely for much longer periods of time.

When the ride is to be a long one, and fatigue of the entire body can be expected, the rider can exercise the option of extending her entire forearms through the rider retaining loops 30 nearest to her, and then grasping the forward rider retaining loops 30 with her hands. This is a good restful position and the hands can either be clinched tightly around the loops, or can be allowed to hold loosely in place with the fingers and thumbs extended as best seen in FIG. 3. Even with the hands not tightly grasping the loops 30, the communication between the driver and the rider is still excellent. This is because any movement on her part is "telegraphed" to the driver by movement of her forearms and the loops 30 around those arms. Any movement on his part is telegraphed to her because of the movement of his safety belt, the loops around her forearms and consequently her forearms themselves.

In the event of any unusual change in direction or motion or any ordinary change of direction or motion, when the hands are loosely in place with the thumbs only inside of the forward loops 30, initial support is provided the forearms by the rearward loops 30 therearound and sufficient time is thus afforded so that the rider can simply complete the closing or clenching of her fists around the loops 30 to give full support to her and full information as to her movements to the driver.

With the arms in this position, sideways or lateral strains can be withstood even though those strains are more than can normally be overcome by the rider hanging on with her hands. This is because a large measure of such sideway strains are at least initially taken by the loops 30 around the rider's forearms.

Because the safety strap extends clear around the waist of the driver and is anchored to the quick release buckle 14 on the one end and the quick release clip 16 on the other end, and because the loops 30 pass clear around this strap 12 and around the relatively wide longitudinally extending inner and outer bands 22 and 24, the belt will not "give way" until the strength of this safety strap 12 or the buckling apparatus 16 and 14 is exceeded.

The embodiments of the invention in which an exclusive property or privilege is claimed are defined as follows:

1. A safety belt adapted to be worn by a driver of a vehicle, said belt including:
   a. a relatively wide, elongated belt band terminating in ends;
   b. coupling means releasably interconnecting the ends of the belt band; and
   c. right and left vertical loops extending entirely around said belt and extending outwardly therefrom, said loops being fastened to said belt and being of configuration such that a passenger riding in tandem behind a driver wearing such a safety belt may insert portions of her arms including her hands through said loops.

2. The safety belt of claim 1 wherein said right and left loops are adapted to be situated generally to the right and left sides of the waist of a driver when said belt is installed on a driver.

3. The safety belt of claim 2 wherein there are at least two right and two left loops, one of each adapted to be situated forwardly of a rear portion of a waist of a driver and one of each being adapted to be situated rearwardly of a forward portion of the waist of said driver.

4. The safety belt of claim 3 wherein said belt band includes:
   a. a strap of flexible material having little tendency to stretch;
   b. inner and outer relatively wide bands of tough flexible material integrally affixed to either sides of said strap; and
   c. wherein said coupling means is operative to interconnect facing ends of said strap.

5. The safety belt of claim 4 wherein said loops are fastened to said belt through each of said bands and through said strap.

6. The safety belt of claim 2 wherein said belt band includes:
   a. a strap of flexible material having little tendency to stretch;
   b. inner and outer relatively wide bands of tough flexible material integrally affixed to either sides of said strap; and
   c. wherein said coupling means is operative to interconnect facing ends of said strap.

7. The safety belt of claim 6 wherein said loops are fastened to said belt through each of said bands and through said strap.

8. The safety belt of claim 5 wherein said loops are each flat enough and wide enough to be adapted to extend over a substantial portion of the hand of a rider.

9. The safety belt of claim 8 wherein said loops are fastened to said belt and said inner and outer bands are affixed to said strap by stitching.

* * * * *